(12) United States Patent
Liu

(10) Patent No.: US 6,393,941 B1
(45) Date of Patent: May 28, 2002

(54) TOE STRAP RECEIVING DEVICE FOR A PEDAL

(76) Inventor: Tsi-Jin Liu, 11F-2, No. 43, Chai-I Street, Taichung City (TW)

( * ) Notice: Subject to any disclaimer, the term of this patent is extended or adjusted under 35 U.S.C. 154(b) by 0 days.

(21) Appl. No.: 09/550,631

(22) Filed: Apr. 17, 2000

(30) Foreign Application Priority Data

Jun. 4, 1999 (TW) ..................................... 88209328 U

(51) Int. Cl.⁷ ................................................ G05G 1/14
(52) U.S. Cl. ..................................... 74/594.6; 74/594.4
(58) Field of Search ........................... 74/594.6, 594.4; 36/131, 132; D12/125

(56) References Cited

U.S. PATENT DOCUMENTS

| | | | |
|---|---|---|---|
| 3,592,076 A | * 7/1971 | Baginski | 74/594.5 |
| 3,842,688 A | * 10/1974 | Baginski | 74/594.6 |
| 4,638,685 A | * 1/1987 | Cigolini | 74/594.6 |
| 4,898,064 A | * 2/1990 | Romano | 74/594.6 |
| 4,953,425 A | * 9/1990 | Barefoot | 74/594.4 X |
| 5,737,977 A | * 4/1998 | Surdi et al. | 74/594.6 |

FOREIGN PATENT DOCUMENTS

| | | | | |
|---|---|---|---|---|
| DE | 3221429 A1 | * 12/1983 | | 74/594.6 |
| DE | 3306925 A1 | * 8/1984 | | 74/594.6 |
| FR | 2502100 | * 9/1982 | | 74/594.6 |
| GB | 170790 | * 11/1921 | | 74/594.6 |
| GB | 485748 | * 5/1938 | | 74/594.6 |
| GB | 871876 | * 7/1961 | | 74/594.6 |

* cited by examiner

Primary Examiner—Vinh T. Luong
(74) Attorney, Agent, or Firm—Charles E. Baxley

(57) ABSTRACT

A pedal has a first engaging member located on a periphery of the pedal for a toe strap connected thereto, and an opening is defined in the periphery of the pedal so that a free end of the toe strap is allowed to be inserted into the opening. A second engaging member is located on a bottom of the pedal body and the toe strap is engaged with the second engaging member. The second engaging member has an enlarged head and the toe strap has a plurality of apertures so that the enlarged head of the second engaging member is engaged with one of the apertures. The free end of the toe strap is positioned at the bottom of the pedal.

1 Claim, 4 Drawing Sheets

TOE STRAP RECEIVING DEVICE FOR A PEDAL

FIELD OF THE INVENTION

The present invention relates to a toe strap receiving device that has an engaging means located on a bottom of a pedal so that the free end of the toe strap is engaged with the engaging means and does not hang around.

BACKGROUND OF THE INVENTION

A conventional pedal for a bicycle is disclosed in FIG. 1 and generally includes a pedal body 1, a first hook member 10 and a second hook member 100 respectively connected to two ends of the pedal body 1. A toe strap 15 has one end thereof securely connected to the first hook member 10 and the other end of the toe strap 15 has a plurality of apertures 150 defined therethrough. The toe strap 15 positions a user's foot on the pedal body 1 by wrapping across a top of the user's foot on the pedal body 1 and one of the apertures 150 is engaged with the second hook member 100. However, as illustrated in FIG. 1, a free end of the toe strap 15 hangs over the pedal body 1 and is not well positioned. Therefore, the free end of the toe strap 15 could hit the ground to generate noise or even be tangled by other objects. This may result in a dangerous accident.

The present invention intends to provide a toe strap receiving device for a pedal so as to well arrange and position the free end of the toe strap on a bottom of the pedal body so that the shortcomings mentioned above are resolved.

SUMMARY OF THE INVENTION

In accordance with one aspect of the present invention, there is provided a combination of a pedal and a toe strap receiving device. The pedal had a first engaging member on a periphery of the pedal body and an opening is defined in the periphery of the pedal body. A second engaging member is located on a bottom of the pedal body. A toe strap has a first end connected to the first engaging member and a free end of the toe strap extends through the opening and is engaged with the second engaging member.

The object of the present invention is to provide a toe strap receiving device that securely positions a free end of the toe strap so that the free end of the toe strap will not hang around.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
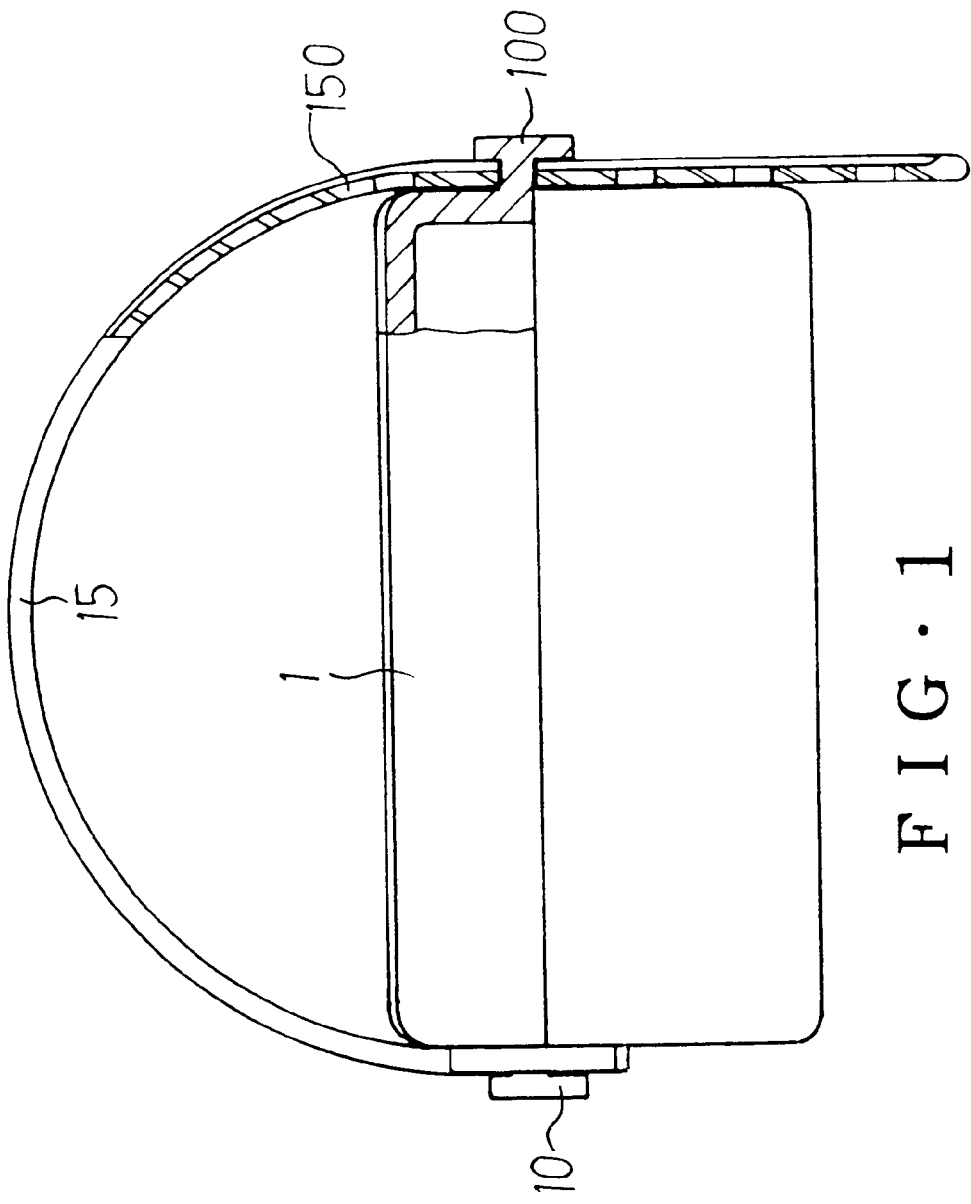
FIG. 1 is a front view to show a conventional pedal and a toe strap, wherein two ends of the toe strap are engaged with two hook members on the pedal.
Figure 2:
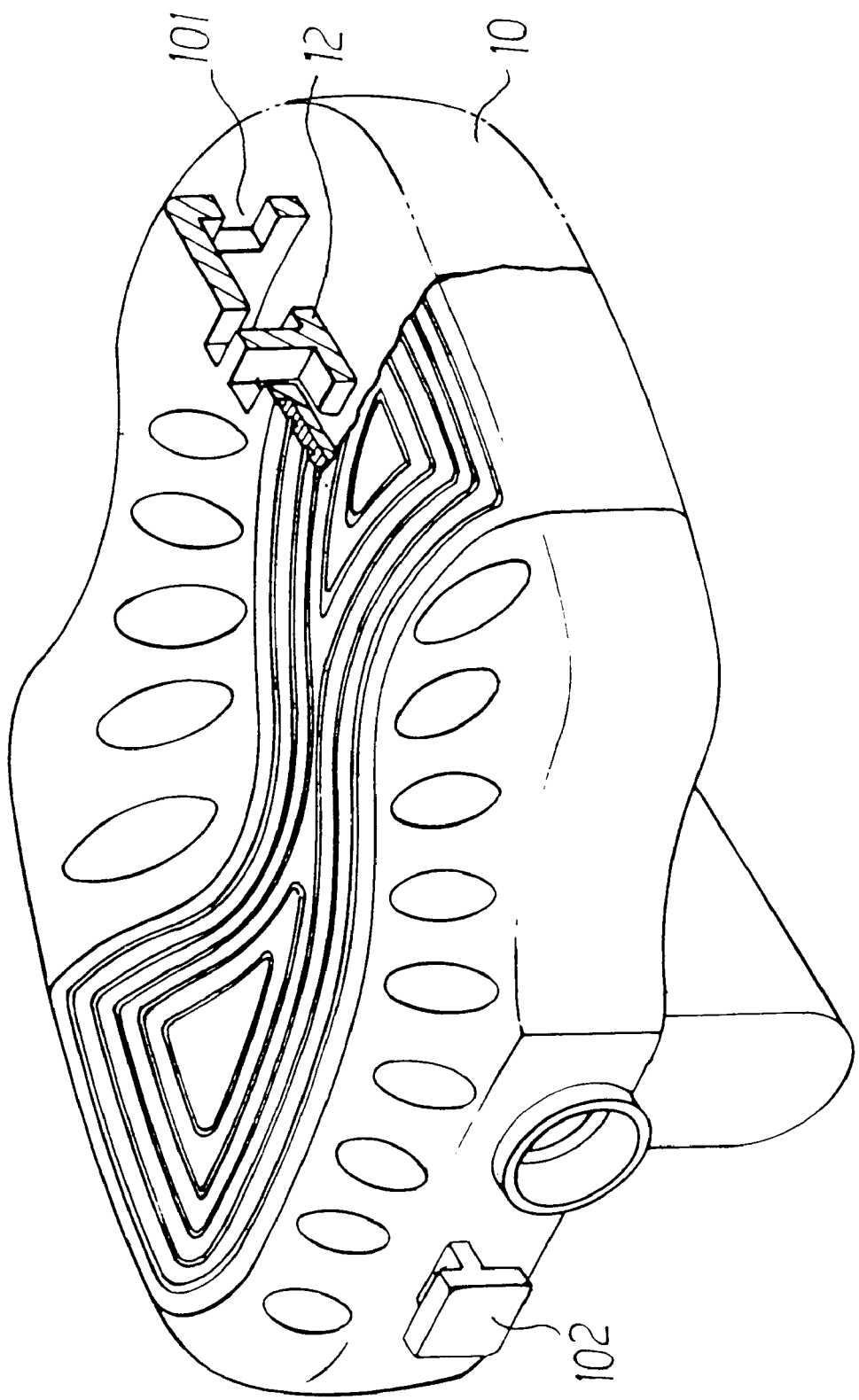
FIG. 2 is a partial cross-sectional view to show a pedal of the present invention.
Figure 3:
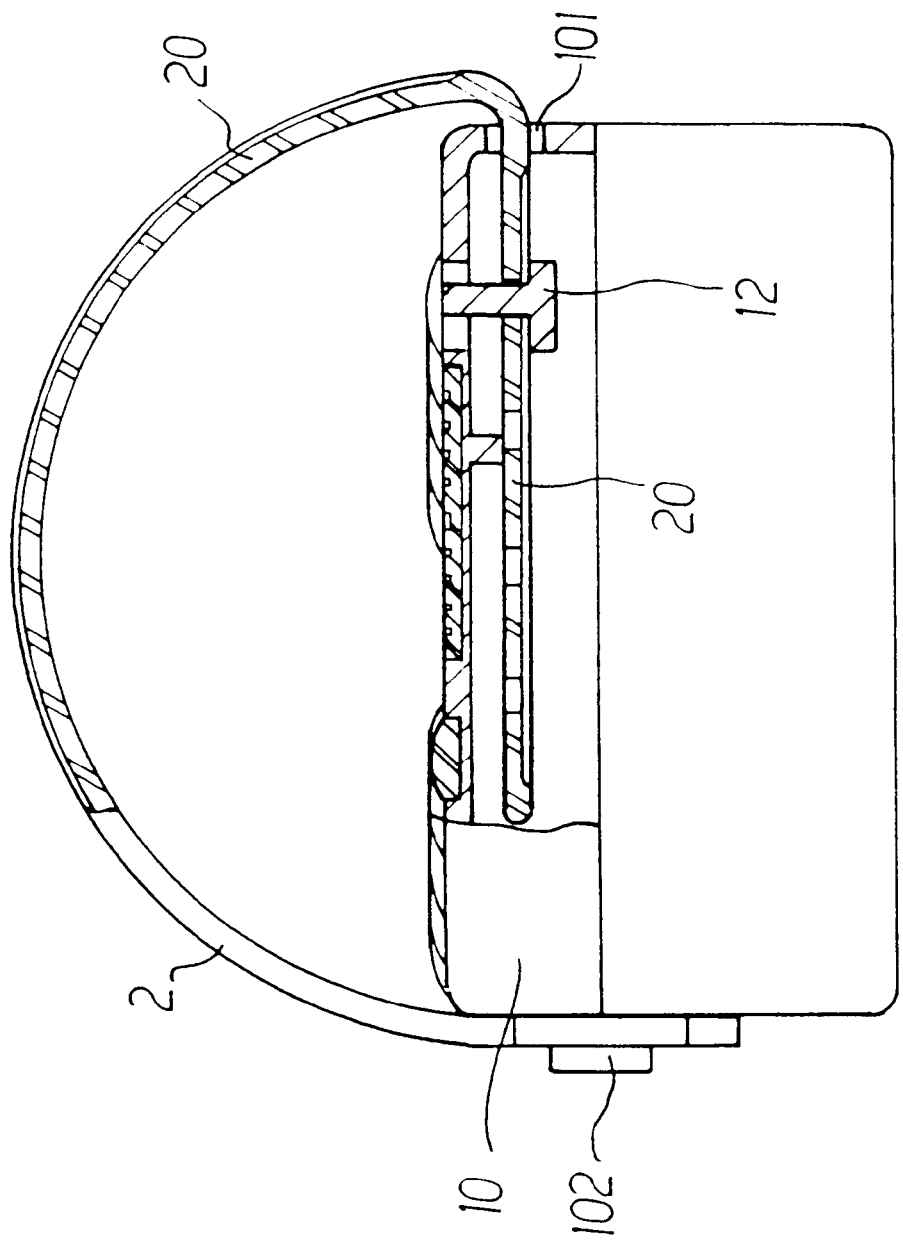
FIG. 3 is a front cross-sectional view to show a free end of a toe strap is engaged with an engaging member on a bottom of the pedal of the present invention.

Referring to FIGS. 2 and 3, the pedal in accordance with the present invention comprises a pedal body 10 having a first engaging member 102 located on a periphery of the pedal body 10 and an opening 101 is defined in the periphery of the pedal body 10. A second engaging member 12 is located between a top and a bottom of the pedal body 10 and has an enlarged head. A toe strap 2 has a first end connected to the first engaging member 102 and a second end of the toe strap 2 extends through the opening 101. A plurality of apertures 20 are defined through the toe strap 2 and the enlarged head of the second engaging member 12 is engaged with one of the apertures 20. When the toe strap 2 is wrapped across a top of the user's foot, the second end of the toe strap 2 is inserted into the opening 101 and is engaged with the second engaging member 12 so that the second end of the toe strap 2 will not hang on an outside of the pedal 10 and is retained at the bottom of the pedal body 10. It is to be noted that the location of the second engaging member 12 can be put on any desired position on the pedal body 10, for example, the second engaging member 12 can be located on a periphery of the pedal body 10.

Figure 4:
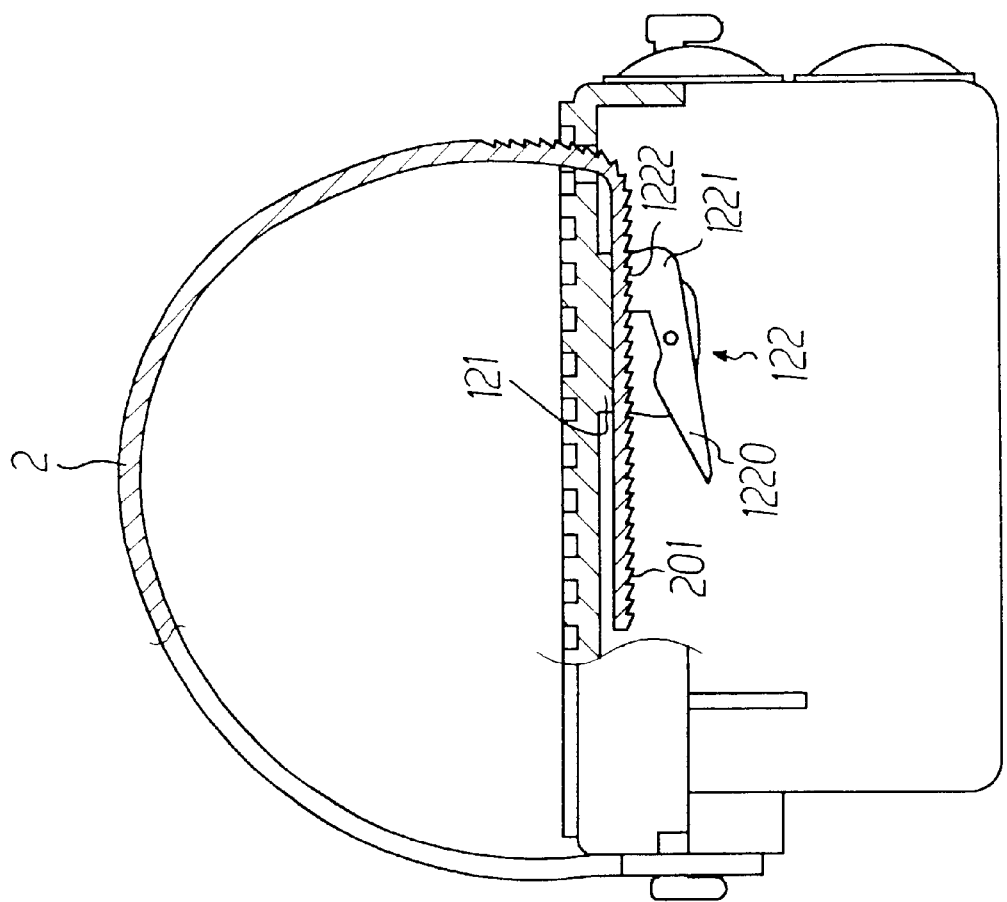
FIG. 4 is a front cross-sectional view to show another embodiment of the engagement between the toe strap and the engaging member on a bottom of the pedal of the present invention.

FIG. 4 shows another embodiment of the toe strap receiving device wherein a plurality of teeth 201 are defined in the toe strap 2. The second engaging member 12 includes a base 121 on the bottom of the pedal body 10 and a pawl member 122 is pivotally connected to the base 121. The pawl member 122 has a tail portion 1220 and a head portion 1221 which has teeth 1222 defined therein. The pawl member 122 is pivotally engaged with the base 121 at a mediated portion between the tail portion 1220 and the head portion 1221. The toe strap 2 extends between the base 121 and the pawl member 122, and the pawl member 122 is engaged with one of the teeth 201 of the toe strap 2.

By the device of the present invention, the second end of the toe strap 2 can be well managed and it is to be noted that in FIG. 4, the pawl member 122 is biased by a spring (not shown) so that the user simply inserted between the pawl member 122 and the base 121, the toe strap 2 is engaged with the teeth 1222 and will not move back unless the tail portion 1220 is pushed.

While we have shown and described various embodiments in accordance with the present invention, it should be clear to those skilled in the art that further embodiments may be made without departing from the scope and spirit of the present invention.

What is claimed is:

1. A combination of a pedal and a toe strap receiving device, comprising:

a pedal body having a first engaging member located on a periphery of said pedal body, an opening defined in said periphery of said pedal body and a second engaging member located between a top and a bottom of said pedal body, said second engaging member having an enlarged head, and a toe strap having a first end connected to said first engaging member and a plurality of apertures defined through a second end of said toe strap, said second end of said toe strap extending through said opening and said enlarged head engaged with one of said apertures.

* * * * *